Patented Oct. 14, 1941

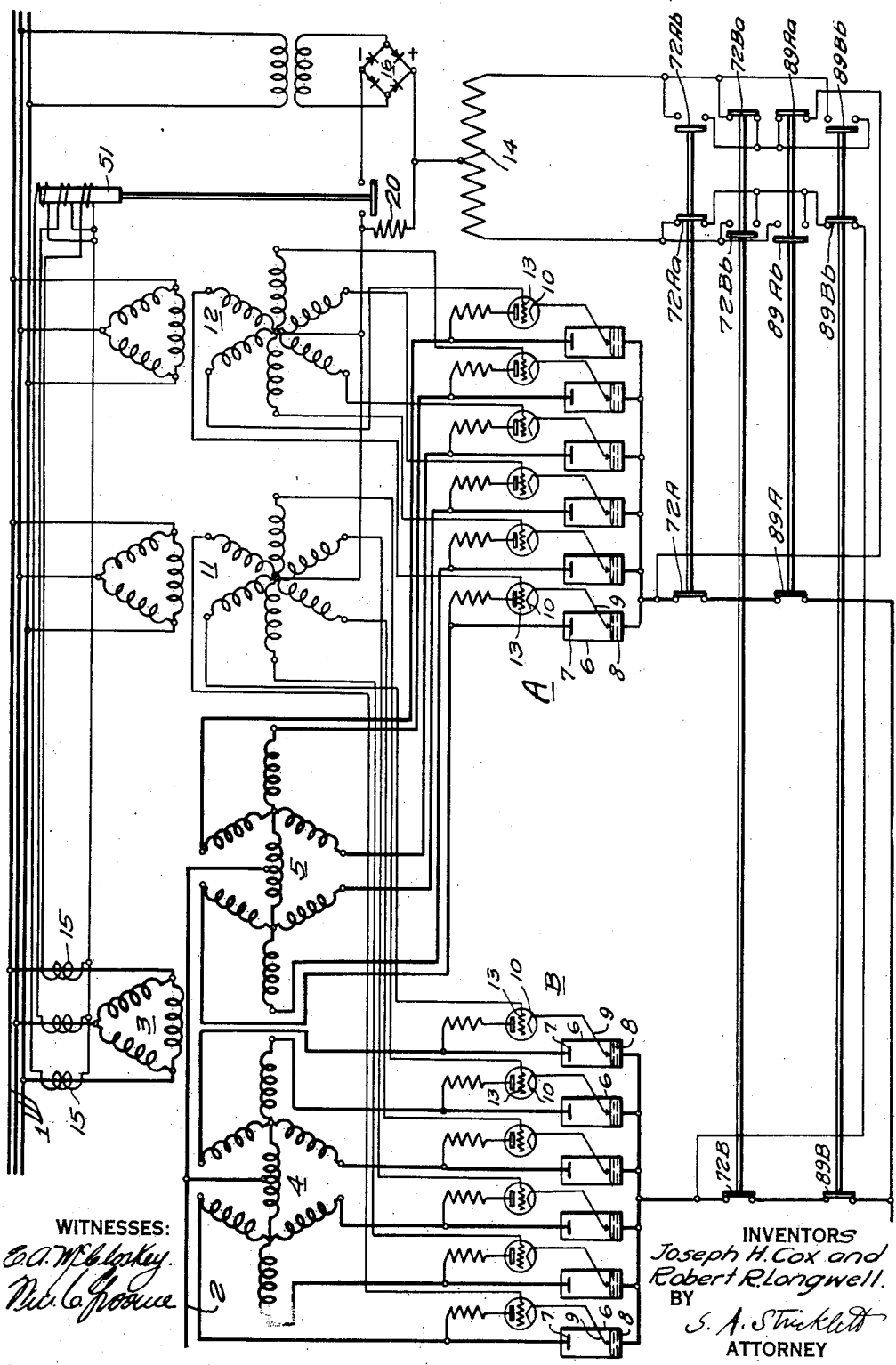

2,259,294

UNITED STATES PATENT OFFICE 2,259,294

ARC SNUFFING CIRCUIT

Joseph H. Cox and Robert R. Longwell, Forest Hills, Pa., assignors to Westinghouse Electric & Manufacturing Company, East Pittsburgh, Pa., a corporation of Pennsylvania Application August 2, 1940, Serial No. 349,658

5 Claims. (Cl. 175—354)

Our invention relates to a vapor electric converter, and particularly to a control system for eliminating arc-backs or internal short circuits to a sectionalized vapor electric device.

In the operation of vapor electric devices, either of the grid controlled or of the make-alive type, it has been proposed to eliminate arc-backs by applying blocking potential either to the grids of the grid controlled devices or to the grids of the firing tubes of make-alive type devices.

However, in the operation of sectionalized converters difficulty has been experienced in securing arc snuffing with a reasonable bias potential, because it is necessary to connect the control potentials to each of the cathodes by means of a suitable balancing resistor and when one of the sections arcs back the potential of the faulty section falls substantially to zero but the potential of the cathode of the non-faulty section is maintained at a high potential by the positive bus. The positive potential of the non-faulty section maintains the connecting resistor at a high positive potential so that the application of a reasonable biasing potential is not sufficient to eliminate the operation of the control grids either in grid controlled devices or in the firing tubes of make-alive devices.

In the construction according to our invention, this difficulty is eliminated by fault responsive switching connections which disconnect the non-faulty section from the equalizing resistor and connect all of the grid circuits directly to the cathode of the faulty section so that a reasonable biasing potential is sufficient to snuff the arc in the faulty section. Obviously the control potentials are even more negative with respect to the non-faulty section but it is usually desired to momentarily interrupt all sections, in order to clear the effects of the fault.

It is, accordingly, an object of our invention to provide a control system for applying negative potential to block the fault in a sectionalized converter.

It is a further object of our invention to provide a fault responsive switching system for so connecting the biasing potentials that a reasonable biasing potential will alleviate the fault conditions.

Other objects and advantages of our invention will be apparent from the following detailed description taken in conjunction with the accompanying drawing, in which the single figure is a schematic illustration of a vapor electric converter utilizing our invention.

In the illustrative embodiment of our invention an alternating current circuit 1 is connected to a direct-current circuit 2 by means of a connecting transformer 3, which connecting transformer 3 has a plurality of substantially independent secondary winding groups 4 and 5. For simplicity of illustration we have shown the secondary winding groups 4 and 5 as being of identical construction. However, it is obvious that they may be of dissimilar construction in order to provide multiplying phase operation of the converter. Each of the secondary groups 4 and 5 of the connecting transformer 3 is connected to a valve type converter A or B, herein illustrated as of a make-alive type, each converter section A or B having a plurality of substantially identical make-alive type valves 6. Each of the make-alive type valves 6 comprises a main anode 7, a cathode 8 and a make-alive electrode 9 for determining the conductivity of the valve 6.

A suitable source of control potential is provided for connection to the make-alive electrodes 9. For simplicity of illustration, we have shown so-called anode firing. That is, the make-alive potential is secured from the main anode circuit. However, it is obvious that any suitable source of control potential can be utilized and in normal construction the control potential is secured from a suitable control transformer (not shown).

The application of the control potential is determined by means of grid controlled firing tubes 10 in series between the control potential and the make-alive electrodes 9. Suitable firing transformers 11 and 12 are provided for supplying control potentials to the grids 13 of the firing tubes 10. Obviously in the application of grid controlled rectifiers, these firing transformers 11 and 12 are directly connected to the control grids of the main valves of the converter.

Each converter section A and B is connected to the direct-current bus 2 by means of suitable circuit breakers 72A and 72B responsive to inverse current through the breaker. In normal operation the firing transformers 11 and 12 are connected to the respective cathodes 8 of the converter sections A and B by means of a suitable balancing resistor 14. The balancing resistor 14 equalizes the potential between the cathodes and supplies a return circuit for the firing transformers 11 and 12.

Suitable current transformers 15 are associated with the alternating current leads of the connecting transformer 3 and a fault responsive relay 51 is energized by the potentials of the current transformers 15. In the event of fault in either of the converter sections A or B, the fault responsive relay 51 picks up and applies a biasing potential which may be secured from any suitable source herein illustrated as an auxiliary full wave rectifier 16 supplied from a suitable alternating current source such as the alternating-current circuit 1.

Upon the closing of relay 51, the source 16 is connected across the resistor 20 which applies the biasing potential between the balancing resistor 14 and the midpoints of the firing transformers 11 and 12. However, during the occurrence of a fault in one of the converter sections, such as section A, the cathode potential of the faulty section A falls substantially to zero and the breaker 72A, associated with that section opens but the bus 2 tends to maintain the cathode of B at normal bus potential and the midpoint of the balancing resistor 14 will be at a positive potential with respect to the cathode of A by roughly one half of the bus potential, which is greater than can be overcome by a reasonable negative biasing potential from the direct current source 16 unless means are provided to disconnect the resistor 14 from the cathode 8 of the non-faulting section.

To eliminate the positive bias during the faulty period, we have provided each of the breakers 72A and 72B, with a plurality of contacts so arranged that when both 72A and 72B are open, the balancing resistor 14 is connected to the respective cathodes of A and B by means of the back contacts 72Ab and 72Bb of the breakers 72A and 72B. Likewise when 72A and 72B are closed, the balancing resistor 14 connects the respective cathodes through the front contacts 72Aa and 72Ba. However, on the occurrence of a fault in any section such as section A, 72A opens, opening its front contact 72Aa and closing its back contact 72Ab so that the balancing resistor 14 is connected only to the cathode of the faulty section A and disconnected from the cathode of the non-faulty section B. The full negative potential of the biasing source 16 is then applied between the cathode of the faulty section A and the midpoints of the firing transformers 11 and 12.

Obviously, this potential is also applied to the midpoints of the firing transformer associated with section B as well as that of section A. However, since it is usually desirable to terminate current flow in both or all of the parallel sections, this application is desirable.

In the event it is desired to close or terminate the operation of any section while permitting the operation of the remaining sections suitable disconnecting switches 89A and 89B are provided in series with the respective cathodes of sections A and B.

When the disconnecting switches 89A and 89B are closed, the potentials of the respective cathodes are applied to the balancing resistor 14 by means of the front contacts 89Aa and 89Ba carried by the disconnecting switches 89A and 89B. However, when one of the disconnecting switches such as 89A is open, the front contacts 89Aa is opened and the back contact 89Ab is closed to disconnect the balancing resistor 14 from the cathode of the inactive section A and lock in the balancing resistor 14 to the cathode of the operation section B.

In this manner our invention secures the application of negative potential of a reasonable value in order to secure blocking of the converter in response to the current fault in either section, and in the event any section is out of service, the remaining section is directly connected to the firing transformers 11 and 12 so that in the event of fault the negative bias is supplied without the intervention of an overbalancing positive potential.

While for purposes of illustration we have shown and described a specific embodiment of our invention, it is apparent that changes and modifications can be made therein without departing from the true spirit of our invention or the scope of the appended claims.

We claim as our invention:

1. An electric current conversion system comprising a plurality of parallel connected groups of vapor electric valves, a control electrode for each of said valves, control means for periodically and successively applying a potential of the proper polarity to said valves to successively render the valves of the several groups conducting, a balancing impedance for connecting said control means to the cathodes of the several groups of valves, a source of biasing potential, fault responsive relay means for connecting the potential of said source between said balancing resistor and said control means, a fault responsive circuit interrupter in series with each group of valves and auxiliary contacts carried by each circuit interrupter for connecting the balancing impedance only to the faulting group in the event of fault actuation of the circuit interrupter.

2. An electric current conversion system comprising a plurality of parallel connected groups of vapor electric valves, a control electrode for each of said valves, control means for periodically and successively applying a potential of the proper polarity to said valves to successively render the valves of the several groups conducting, a balancing impedance for connecting said control means to the cathodes of the several groups of valves, a source of biasing potential, fault responsive relay means for connecting the potential of said source between said balancing resistor and said control means, a fault responsive circuit interrupter in series with each group of valves and auxiliary contacts carried by each circuit interrupter for connecting the balancing impedance only to the faulting group in the event of fault actuation of the circuit interrupter, a sectionalizing switch in series with each group of valves and auxiliary contacts carried by the sectionalizing switch such that opening the sectionalizing switch locks out the disconnected section.

3. A vapor electric converter comprising a plurality of parallel operating sections, each section containing a plurality of similar electric valves, a control electrode for each of said valve control means for periodically impressing potentials on said control electrodes for determining the conductivity of said valves, a fault responsive circuit breaker in series with each section of said converter, a balancing resistor, auxiliary contacts carried by said circuit breakers for connecting said balancing resistors to the several cathodes both when all of said breakers are open and when all of said breakers are closed, a source of biasing potential, fault responsive means for connecting the potential of said source between said balancing resistor and said control means, the contacts on said fault responsive breakers being effective on the operation of one breaker to disconnect the balancing resistor from the non-faulting sections to render the bias potential effective to block operation of the valves of the converter.

4. A vapor electric conversion system comprising a plurality of parallel operating sections, each section including a plurality of electric valves, a firing transformer for controlling the conductivity of said valves, means including a balancing resistor for connecting said firing transformer to the cathode of said valves, a fault responsive circuit breaker in series with each section of said converter, switching means actuated by said fault responsive circuit breakers, said switching means being operative to disconnect the balancing resistor from the non-faulting sections in the event of fault in one of the sections, a source of biasing potential and a fault responsive relay for connecting said biasing potential to said firing transformer.

5. A vapor electric conversion system comprising a plurality of parallel operating sections, each section including a plurality of electric valves, a firing transformer for controlling the conductivity of said valves, means including a balancing resistor for connecting said firing transformer to the cathode of said valves, a fault responsive circuit breaker in series with each section of said converter, switching means actuated by said fault responsive circuit breakers, said switching means being operative to disconnect the balancing resistor from the non-faulting sections in the event of fault in one of the sections, a source of biasing potential and a fault responsive relay for connecting said biasing potential to said firing transformer, a disconnect switch in series with each section of the converter and auxiliary contacts carried thereby to render said fault responsive breakers ineffective to connect the balancing resistor to the disconnected section.

JOSEPH H. COX.
ROBERT R. LONGWELL.